March 16, 1965 M. N. MOORE 3,173,501
UNITARY HIGH FREQUENCY IMPACT AND ROTARY DRILLING APPARATUS
Filed April 19, 1960 3 Sheets-Sheet 3
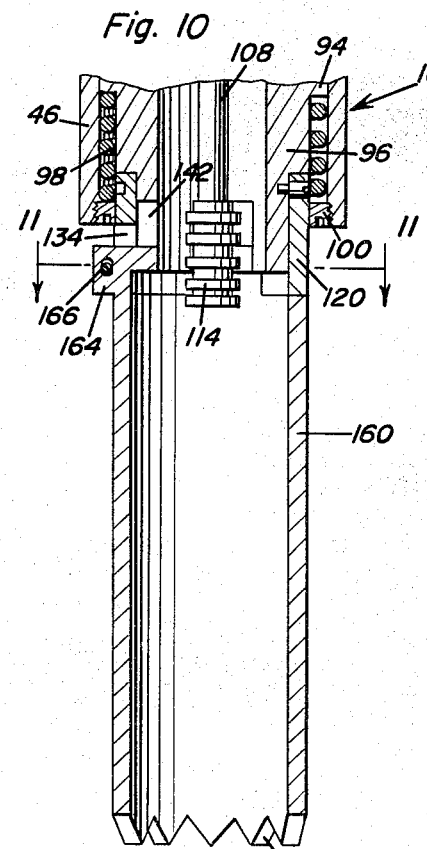
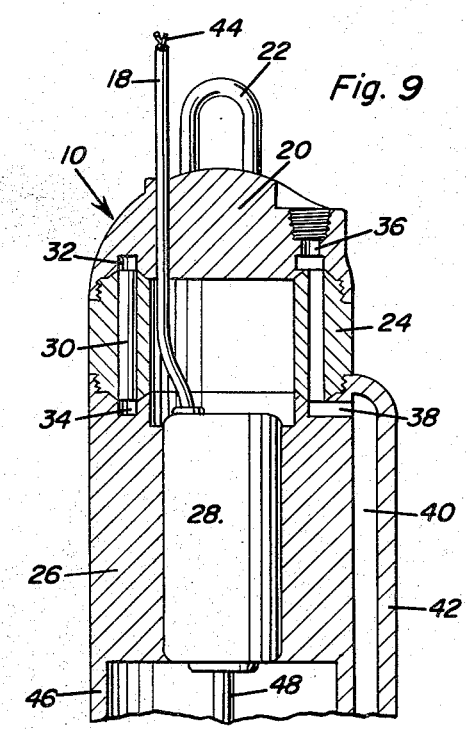
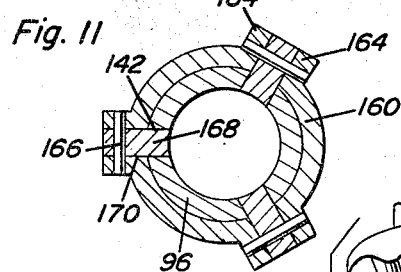
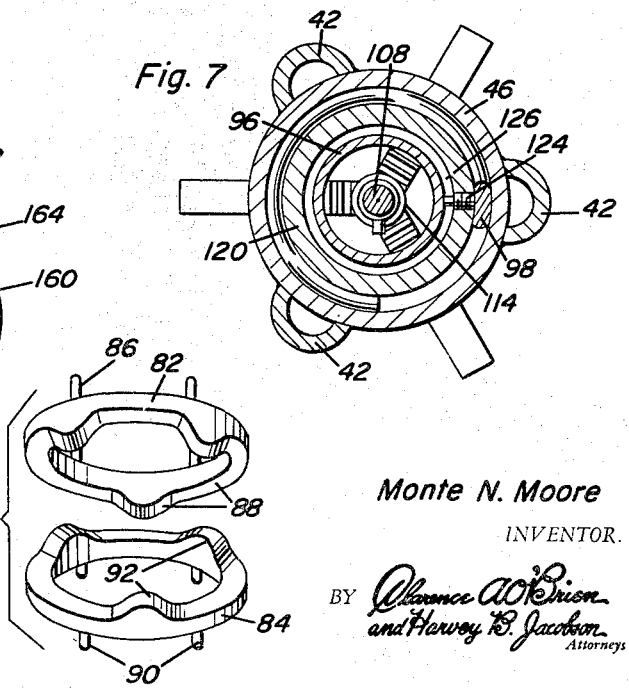
Monte N. Moore
INVENTOR.

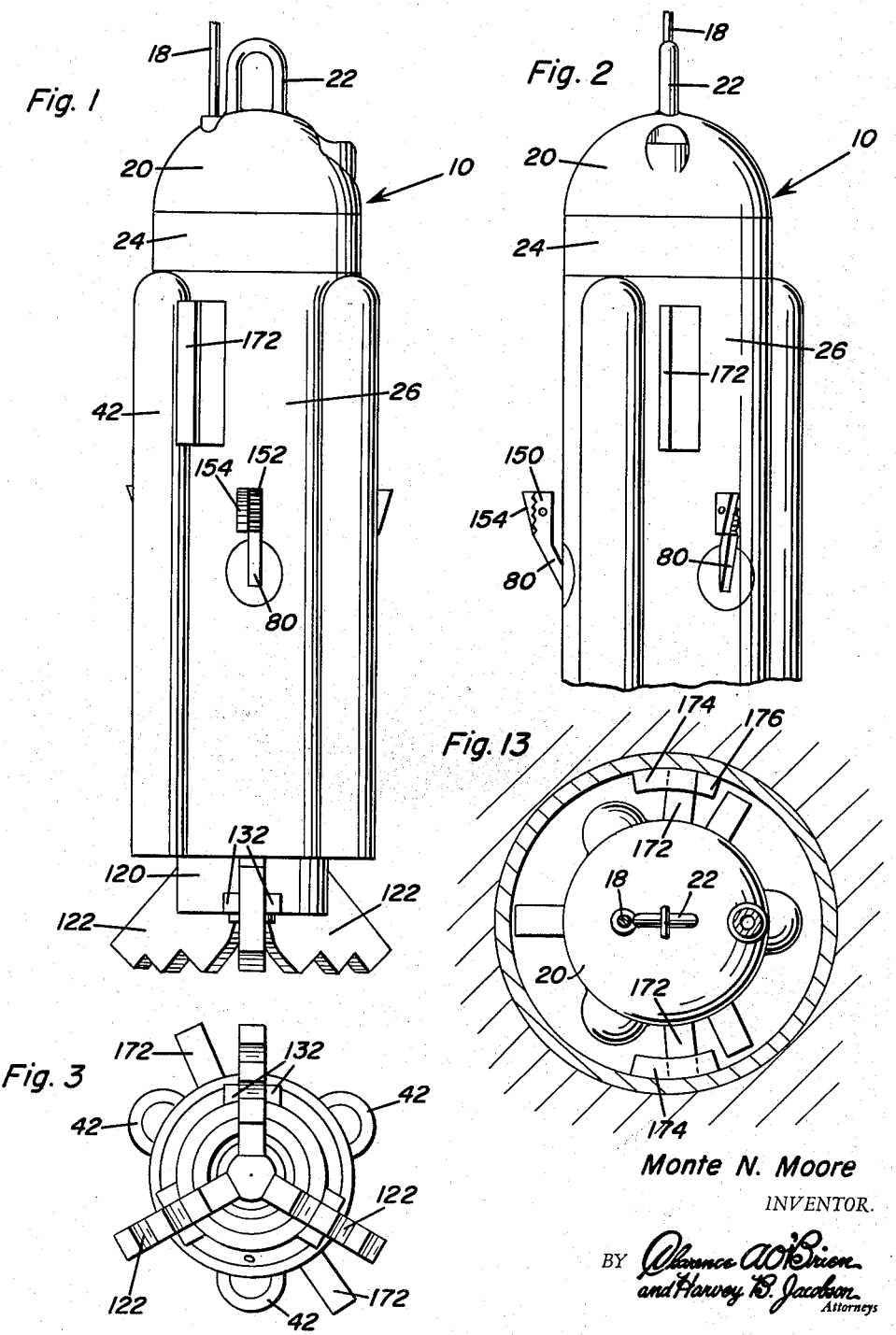

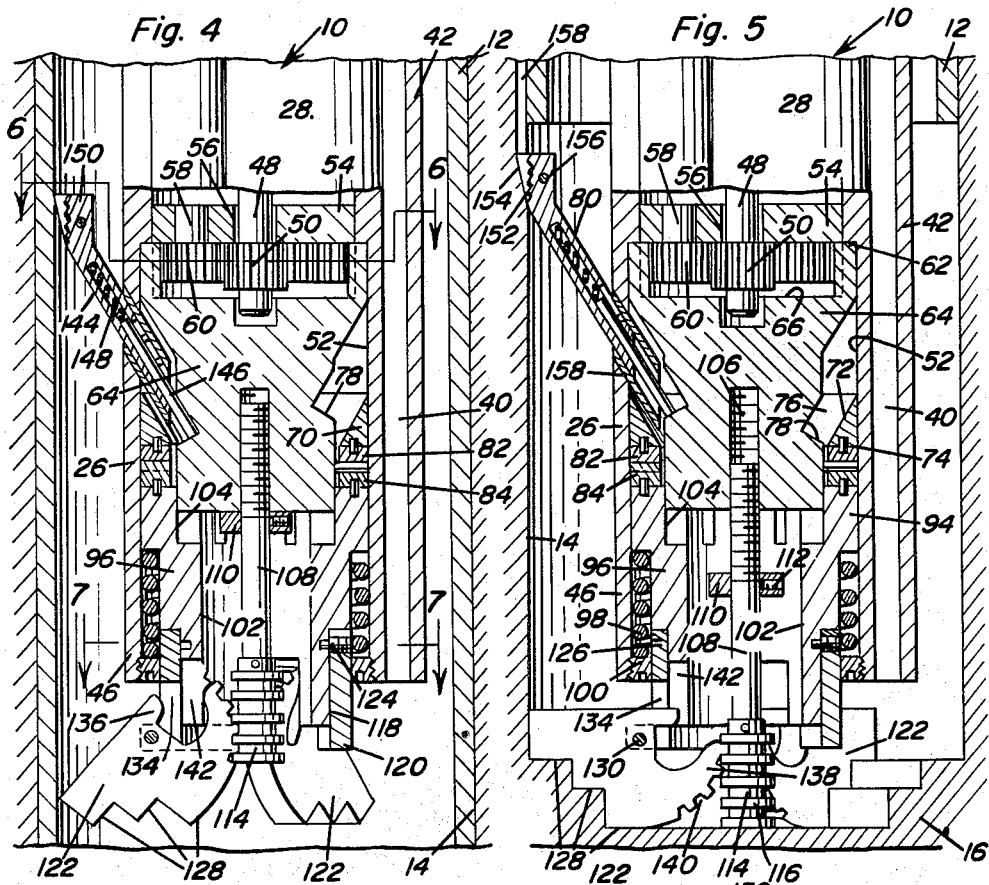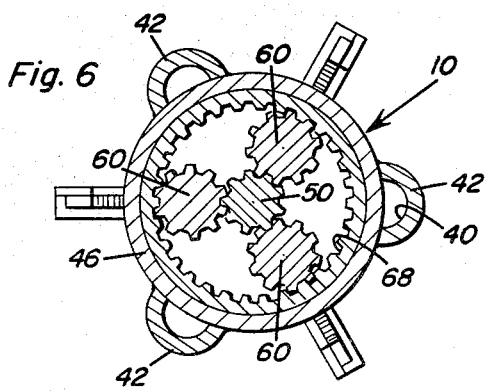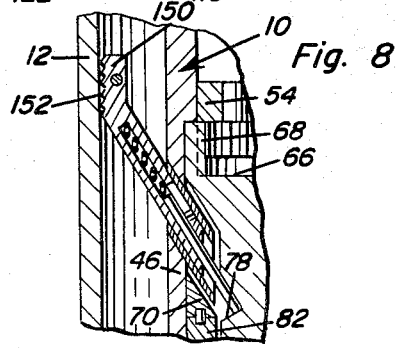

United States Patent Office 3,173,501
Patented Mar. 16, 1965

3,173,501
UNITARY HIGH FREQUENCY IMPACT AND
ROTARY DRILLING APPARATUS
Monte N. Moore, Flint, Mich., assignor to Carpac Investments Limited, Sarnia, Ontario, Canada
Filed Apr. 19, 1960, Ser. No. 23,266
17 Claims. (Cl. 175—94)

This invention comprises a novel and useful unitary high frequency impact and rotary drilling apparatus, and more particularly relates to an apparatus to effect in an improved manner drilling or relatively deep holes or bores and through various types of formations such as those required in the drilling of oil wells and the like.

The primary object of this invention is to provide an apparatus wherein the advantages of the rotary drilling method and the impact drilling method are efficaciously combined in an improved mechanism and in an improved manner.

A further object of the invention is to provide an apparatus in accordance with the preceding object whereby the source of power for imparting both reciprocatory and rotary motion to the drill be positioned closely adjacent to the drill bit regardless of the depth at which the latter is employed below ground.

A further object of the invention is to provide a drilling apparatus whereby an electric motor may be coupled to mechanism for driving a drill bit and may be suspended at the lower end of a pipe or tubing string whereby the motor may be located very closely adjacent to the drill bit for reducing any torque lag therebetween such as that commonly encountered in the use of a rotary drill stem powered by the usual rotary table at the surface of the ground.

Yet another object of the invention is to provide a drilling apparatus in accordance with the preceding objects wherein the drill bit will be radially expansible in order to enable it to undercut a casing string in order that the casing may then be enabled to follow the bit downwardly into the bore as the latter is being drilled.

A further object of the invention is to provide a drilling apparatus wherein a motor unit is coupled to a drill bit at the lower end of a supporting string or tubing or pipe and whereby the motor unit is releasably locked to the lower end of a casing string to prevent relative rotation of the motor unit and whereby the casing string may be employed to lower the apparatus into a well bore.

It is a further object in accordance with the immediately preceding object to provide a construction whereby the motor unit may be selectively unlocked from the casing string and operated for further drilling below the latter.

It is a further and more specific object of the invention to provide a drilling apparatus wherein a source of power will be connected to a drill bit for positioning at the bottom of the well bore in such a manner that the initial rotation of the bit in one direction by the power unit will mechanically expand the bit to its greatest extent and lock the bit in its expanded and drilling position, while further operation of the power unit in the same direction of rotation will effect rotation of the bit, and in timed relation thereto, will also effect vertical reciprocation of the bit whereby to obtain a combined rotary and impact drilling from the bit; while operation of the power unit in the other direction will contract the bit to enable its withdrawal with the power unit through the casing string.

Another object of the invention is to provide a drilling apparatus whereby the expansible drill bit may be readily replaced by a core drill.

A further and more specific object of the invention is to provide a drilling apparatus in conformity with the immediately preceding object whereby the expansible drill bit may be readily replaced by a core drill and wherein means are provided for preventing operation of the bit expanding mechanism when the core drill is applied to the drill bit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a drilling apparatus in accordance with this invention, the same including an electric motor and an expensible drill bit positively connected thereto and supported and driven thereby;

FIGURE 2 is a fragmentary elevational view taken at right angles to that of FIGURE 1;

FIGURE 3 is a bottom plan view of the apparatus of FIGURES 1 and 2;

FIGURE 4 is a view taken upon an enlarged scale and in vertical central section through a portion of the lower end of a casing string in a well bore and of the drilling apparatus in accordance with this invention disposed therein in collapsed position for passage of the drilling apparatus through the casing string;

FIGURE 5 is a view similar to FIGURE 4 but showing the device projected from the lower end of the casing string and with the bit in its expanded operative position for continuing the drilling of the well bore beneath the casing string;

FIGURES 6 and 7 are horizontal sectional views taken substantially upon the planes indicated by the section lines 6—6 and 7—7, respectively, of FIGURE 4;

FIGURE 8 is a detail view of a portion of FIGURE 4 and illustrating the operation of the reciprocating jacks for effecting movement of the drilling unit out of the casing string and downwardly in the well bore for further drilling operation;

FIGURE 9 is a view in central vertical section of a portion of the upper end of the apparatus;

FIGURE 10 is a fragmentary view similar to FIGURES 4 and 5 but showing the core drill detachably mounted upon the unit in place of the expansible bit;

FIGURE 11 is horizontal sectional view taken substantially upon the plane indicated by the section line 11—11 of FIGURE 10;

FIGURE 12 is a group perspective view of the cam elements effecting vertical reciprocation of the drill bit; and FIGURE 13 is a horizontal sectional view through the casing and well bore above the drilling apparatus.

The novel drilling apparatus in accordance with this invention is identified herein generally by the reference numeral 10, and as shown in FIGURES 4, 5 and 8, is movable through and selectively carried by the lower end of a well casing string 12, positioned in a well bore 14 extending into an earth formation 16. It will be understood that this casing string consists of a plurality of casing sections successively connected at adjacent ends to each other and which are progressively lowered into the well bore as the drilling operation progresses. In a manner to be subsequently set forth, the drilling apparatus 10 is detachably mounted in, secured to, and carried by the lowermost section of the casing string 12 so that the apparatus may be raised or lowered in the well bore 14 by manipulating the casing string.

A suitable string of flexible tubing or pipe 18 extends from the surface through the casing string 12 and the well bore 14, being coupled to the drilling apparatus 10. This string of pipe or tubing serves to house the means by which the drilling apparatus is operated or powered as set forth hereinafter.

With special reference to FIGURES 1, 2, 4, 5 and 9, it will now be seen that the drilling apparatus 10 consists of a suitable enclosing casing or housing having the detachably or removably connected upper portion 20 provided with a lifting bail 22 thereon and which is secured by a connecting section 24 to a main section 26 having therein a motor unit, indicated generally by the numeral 28, an operating mechanism for the drill bit or drilling unit, and at its lower end the drill bit or core drill which are rotatably mounted on and carried by the motor unit.

The motor unit 28 is of any desired and suitable construction, consisting of a reversible, submersible type of motor capable of operation at the bottom of a well bore when the latter is filled with the drilling fluid necessary to prevent the well bore from caving in below the casing string.

As shown in FIGURE 9, the connecting section 24 is detachably connected as by a screw-threaded engagement with the upper portion 20 and the main section 26. A plurality of passages or bores 30 extending longitudinally through the wall of the connecting section establish registry with annular channels 32 and 34 in the adjacent end faces of the sections 20 and 26 whereby drilling or other fluid from any suitable source may pass by a tubing, not shown, to the inlet passage 36 in the member 20 and from thence by the bores 38 and the passages 40 in the external, longitudinal ribs 42, to the underside of the apparatus.

At this point it should be noted that although it is preferred to support and carry the apparatus by detachably and releasably connecting the same to the lowermost casing section with the interior thereof or to other suitable or special portions of the casing string, it is also possible to support the apparatus in any other manner, as by a wire line or the like attached to the bail 22, with the casing string being omitted and with the well bore being filled with drilling fluid to prevent the well bore from caving in as the drilling operation progresses. In either mode of practicing the invention, that is, either by supporting the drilling apparatus by the casing string or by some other means, it is to be understood that a continuous circulation of drilling fluid is generally unnecessary, although in some instances circulation may be effected by any suitable means, not shown, including the above mentioned system of passages and bores for the purpose of introducing the drilling fluid to the well bore, circulating the same therethrough, and withdrawing the fluid from the top of the well bore in the usual manner for the purpose of removing the drill cuttings as the drilling operation progresses. However, since the principles of the invention described and claimed hereinafter are in no way limited to any particular construction of a drilling fluid circulating system, it has been deemed unnecessary to illustrate and describe the same herein.

Where the motor unit 28 includes an electric motor as a source of power, the necessary electric cables 44, see FIGURE 9, for supplying power to the motor unit will pass through the string of tubing or pipe 18. In other instances, the power unit within the motor unit 28 may consist of a fluid pressure operated motor of suitable type, in which event, fluid for the operation of the motor will be supplied through the tubing or pipe string 18. It is therefore to be understood that the particular type of power unit housed within the casing or container of the motor unit 28 is likewise immaterial for the purposes of this invention, it being merely desirable that the motor unit and the drill bit be positively connected to each other so as to provide a unitary assembly which will move downwardly in the well bore and be positioned at the bottom of the well bore as the drilling operation progresses.

The lower portion of the main housing section 26 may conveniently comprise a generally cylindrical sleeve, as shown in FIGURES 4 and 5 at 46, which is open at its lower end and into the upper end of which extends the power shaft 48 from the power plant 28 within the upper portion of the casing section 26 which houses the motor unit 28. The power shaft 48 has a power output or driving gear 50 fixedly secured thereto. The gear 50 constitutes the immediate source of power for the propulsion, vibration and rotation of the device. Fixedly secured in the upper portion of the chamber 52 which is enclosed by the sleeve or skirt 46 is a partition 54 having a central opening 56 through which extends the power shaft 48 into the chamber 52. Carried by the partition 54 and also extending into the chamber 52 are stub axles 58 having journaled thereon idler gears 60 which are continuously meshed with the power output or driving gear 50.

It will be observed from FIGURES 4, 5 and 8 that the lower face of the partition 54 lies flush with the annular shoulder 62 of the upper end of the chamber 52. A rotor or body 64 has its cylindrical upper end rotatably received in the chamber 52 and abutting against the annular shoulder 62 and the partition 54. A recess 66 is formed in the upper end of the rotor 64 and receives the gearing 50, 60 therein. The inner peripheral wall of this recess has secured thereto or is integrally provided thereon with an internal ring gear 68 which is fixedly secured to the rim of the body 64 and is continuously engaged with the idler gears 60, as shown in FIGURE 6. The arrangement is such that the driving gear 50 through the idler gears 60 drives the ring gear 68 thus providing a reduction gear drive for the rotor or body 64. It will be further understood that the body 64 is retained upwardly in the chamber 52 against the annular shoulder 62 and the lower face of the partition 54 by any suitable means, not shown, which in itself forms no part of the present invention as claimed hereinafter.

At this point it should be understood that the rotor or body 64 driven through the reduction gearing previously mentioned constitutes a means which is utilized to effect the various functions of expanding or contracting the drill bits; rotating the drill bits; effecting a vertical reciprocation or vibratory motion of the drill bits; and further effecting a step-by-step progression of the drilling apparatus downwardly from the casing and downwardly into the well bore all in a manner to be subsequently described.

Fixedly secured in any desired manner in the sleeve 46 is a removable ring 70 having a cavity in its upper portion provided with a conical surface 72 and having a flat annular bottom surface 74. Adjacent this ring and extending upwardly therefrom the rotor 64 is of a generally conical downwardly narrowing configuration providing a clearance between the rotor and the wall of the chamber 52 which clearance terminates at its lower end in an annular chamber 76, see FIGURE 5. Formed in the wall of the rotor 64 at the bottom of the annular chamber 76 is an axial cam track 78 which is employed when desired to effect operation of a set of reciprocating legs or jacks indicated by the numeral 80 and by means of which a step-by-step motion is imparted to the drilling apparatus as set forth hereinafter.

Referring now to FIGURES 4 and 5 in conjunction with FIGURE 12 it will be observed that a cam means for effecting vertical reciprocation of the drill is provided. This consists of a stationary cam ring 82 and a rotating cam ring 84.

The stationary cam ring has upwardly projecting pins 86 together with downwardly projecting axial cam lobes 88. In a similar manner the lower rotary cam ring 84 has downwardly projecting pins 90 together with upwardly projecting axial cam lobes 92. The pins 86 of the upper ring are engaged in suitable sockets in the annular surface 74 of the stationary removable ring 70 whereby the upper cam 82 is held in a stationary position. The lower cam ring has its depending pins 90 secured in sockets in the upper end 94 of a sleeve-like body 96 which is movably mounted in the chamber 52. The body 96 comprises a carrier for the bits of the drill.

As so far described it should be understood that the upper cam ring 82 is maintained in a stationary condition by and is mounted upon the lower surface of the immovable ring 70 and is complementary to the rotary ring 84 which is carried by the reciprocable and rotatable body or drill bit carrier 96, it being now evident that as rotation is imparted to the carrier 96 the engagement of the cam projections 88 and 92 will effect a vertical reciprocation or vibration of the body 96 and the drill bits carried thereby.

In order to maintain the desired operative contact between the rotary and stationary cam rings 82 and 84, it will be observed that the upper portion 94 is of relatively enlarged diameter with respect to the diameter of the lower portion of the body 96. There is thus provided an annular space between the latter and the sleeve 46 in which is received a compression spring 98 retained therein as by a screw-threaded retaining nut 100. The spring yieldingly urges the carrier 96 upwardly so that its rotatable cam ring will be maintained in operative contact with the stationary cam ring.

It will be observed that the drill bit carrier 96 is provided with an axial bore 102 extending therethrough and axial splines 104 are formed in the upper end of this bore to receive correspondingly shaped portions at the lower end of the rotor 64. The splines are of such length, as shown in FIGURES 4 and 5, that they will maintain a rotatable driving engagement between the rotor 64 and the carrier 96 despite vertical reciprocation of the latter under the influence of the cams 82 and 84 and the spring 98.

Extending upwardly into the rotor 64 from the bottom surface thereof is an axially disposed internally threaded bore 106. An actuator 108 in the form of a rod or screw is threadedly engaged in this bore and projects downwardly therefrom through the central cavity 102 of the carrier 96. Adjustably secured upon the actuator is a stop member 110 in the form of a collar provided with a setscrew 112 whereby the same may be locked or secured in longitudinally adjusted positions upon the actuator rod.

At its lower end, the actuator rod 108 has a cylindrical rack member 114 suitably secured thereto which is provided with annular ribs or teeth as at 116. It is to be understood that the actuator 108 is readily rotatable within the threaded bore 106, its upward travel being limited by engagement of the adjustable stop member 110 with the undersurface of the body 64 as will be seen by a comparison of FIGURES 5 and 4. The actuator constitutes a means by which expansion and contraction is effected of the drill bits in a manner to be now described.

At its lower end, the external surface of the carrier 96 is diametrically reduced to provide a cylindrical surface 118 upon which is freely rotatably mounted a sleeve 120 which serves as a means for directly supporting and mounting a plurality of drill bits 122. This sleeve is removably retained upon the carrier 96 as by means of setscrews 124 which are engaged in an annular channel or groove 126 provided upon the external cylindrical surface 118. By means of these screws the sleeve 120 is thus rotatably mounted upon the lower end of and projects below the lower end of the carrier 96 but is held against axial movement relative thereto and is thus reciprocable therewith.

Any desired number of the movable drill bits 122 may be pivotally mounted upon the sleeve support member 120. FIGURE 7 shows the provision of three such bits for clarity of illustration. Each bit is preferably a plate-like member having the usual stepped cutting edges or teeth 128 thereon. Intermediate its ends each bit is pivotally mounted as by a pivot pin 130 which is disposed between and secured to pairs of laterally projecting lugs 132, see also FIGURES 1-3, which are carried by and project radially outwardly from the lower end of the bit supporting sleeve 120. There are also provided axially extending slots 134 extending longitudinally in the lower portion of the sleeve 120 and which are positioned for reception therein of locking fingers 136 carried by the bits 122.

Each of the bits is provided with an arcuate terminal portion 138 having teeth 140 which engage in the ribs 116 of the rack 114.

The arrangement of these elements is such that as axial movement is given to the actuator bar 108, the rack teeth 116 which are continuously engaged with the teeth 140 on the end portion of the drill bits will effect pivoting movement of the drill bits about their pivot pins 130 between the collapsed or retracted position of the bits shown in FIGURE 4 and the fully expanded or operative position of the bits shown in FIGURE 5. From a further comparison of FIGURES 4 and 5, it will be noted that in the retracted or collapsed position, the locking fingers 136 of the bits are withdrawn from the locking slots 134 of the sleeve 120 while in the operative position of the bits the locking fingers extend through these slots in the sleeve and into complementary slots 142 in the lower portion of the carrier 96. When the locking fingers are thus engaged it is evident that the sleeve 120 is locked to the carrier 96 against relative rotation.

The operation of this portion of the apparatus and the purpose for this construction will now become apparent. With the actuator rod 108 in its raised position shown in FIGURE 4 as by rotating the rod into the threaded bore 106 of the rotor 64 until the stop 110 abuts the bottom surface of the rotor, it will be observed that the bits 122 are pivoted into their retracted position with the locking fingers 136 being withdrawn from the locking slots 134 and 142. In this position the over-all diameter of the drilling apparatus is such that it may now be passed through the casing 12 as shown in FIGURE 4. After the end of the drilling apparatus has emerged from the casing, regardless of whether the device is still secured rigidly to the casing or is released therefrom as shown in FIGURE 5, it is then desired to expand the drill bits 122 into their operative position shown in FIGURE 5. For this purpose, the motor unit 28 is operated and through the reduction gear assembly imparts rotation to the rotor 64. The latter in turn through its splined connection at 104 imparts rotation to the carrier 96. At this time it will be understood that the bits are still in their collapsed position of FIGURE 4 although they are now engaged with the bottom of the well bore by letting the weight of the apparatus rest thereon. Consequently, as rotation is imparted to the carrier 96, the engagement of the drill bits with the bottom of the well bore preventing rotation of the latter, there is relative rotation between the carrier and the sleeve 120.

The frictional drag between the engagement of the teeth 140 of the drill bits and the teeth 116 of the sleeve 114 on the actuator rod 108 and also the frictional engagement of the actuator rod or the sleeve 114 with the bottom of the well bore will tend to prevent rotation of the actuator, and thus will promote relative rotation between the screw threads of the actuator and the threaded bore 106. This will result in relative rotation between the actuator rod 108 and the threaded engagement of the latter in the rotor 64 which will thus move the actuator rod downward from the position shown in FIGURE 4 to the position shown in FIGURE 5. During this downward travel the gear teeth 116 by engagement with the teeth 140 will cause pivoting movement of the drill bits to their operative or expanded position with the locking fingers 132 being received within the slots 134 and 142. This will in turn lock the sleeve 120 to the carrier member 96 preventing any further rotation therebetween so that the rotation imparted by the rotor 64 to the carrier 96 through the splines 104 will be carried through this locking finger arrangement to the drill bits. The pivots 130 are thus relieved from the torque or strain of such rotation.

After the drilling operation has been completed and it is desired to collapse the drill bits and retract the apparatus through the casing, the reverse operation is performed.

It should be observed that the initial portion of rotation of the rotor 64 by the motor unit 28 serves to either expand the drill bits or collapse the same depending upon the direction of rotation. In either expanded or contracted condition, further rotation is effected to effect the rotary movement of the drill bits.

Attention is now directed more particularly to FIGURES 4 and 5 and in general to FIGURES 1 and 2. In these figures it will be observed that the previously mentioned jacks or legs 80 are utilized to effect a step-by-step progress of the apparatus relative to either the well casing or the well bore. It should be here understood that the same construction of jack is employed for either purpose but a slight modification of the foot structure of the jack is necessary.

Each jack consists of a pair of telescoping rod-like members the same including an outer hollow rod 144 in which is slidably received an inner rod 146. A compression spring 148 within the outer rod yieldingly urges these two members into their longitudinally extended position.

At their outer ends the cylindrical members 144 are provided with enlarged foot members 150 which are preferably toothed or serrated as at 152, see FIGURE 8, in order that they may obtain a secure grip upon the interior surface of the casing 12 or the well bore 14. When it is desired to use the jacks to propel the apparatus downwardly from the end of the casing into the well bore, extension plates 154 are secured as by pivots 156 to the foot members 150, these plates penetrating the side of the well bore to form channels as at 158. This penetration of the plates into the material of the well bore serves to guide and retain the drilling apparatus for movement in a straight line in the well bore. Obviously, these plates are not needed when the device is not to be moved from the casing string but is merely to be advanced or retracted in the latter.

In operation, the inner rod 146 of the jack assembly is urged by the spring 148 into engagement with the jack actuating cam track 78 previously mentioned while the foot member is resiliently urged against either the casing wall or the well bore. Accordingly, upon rotation of the rotor 64, the cam member will impart periodic reciprocation to the jacks thus producing a step-by-step propulsion of the apparatus. It will be observed that the jacks are slidably received in guide sleeves 158 which extend through the wall of the sleeve 46 in proper position to guide the reciprocating jacks. It will now be seen that the annular clearance space 76 previously mentioned provides clearance to receive the reciprocating inner member 146 of the jacks. Any desired number of the jacks may be employed, the arrangement of three such jacks being indicated in the drawings for the purpose of convenience.

It will be understood that where it is desired to mount or secure this apparatus in the lower end of a casing string, the jacks will be omitted from the device since they can be readily inserted into or removed from the sleeves 158. When removed from the sleeves and the drilling device is employed without the use of the jacks, it will probably be preferable to suitably close the end of the sleeves to prevent the ingress of well fluids or other substances into the apparatus.

FIGURES 4 and 5 indicate the arrangement of the jacks with the plates 154 secured thereon where it is intended that the drilling apparatus shall be propelled from the lower end of the casing string and then shall propel itself during the drilling of the well bore. In FIGURE 8 there is shown the form of jack employed with the plates 154 omitted therefrom when it is merely desired to advance the apparatus within the casing string but not to propel the same outwardly therebeyond.

An important feature of this invention is that the same apparatus may be employed to operate a core drill for obtaining core samples from a well bore. For this purpose it will be merely necessary to remove physically a series of cutter bits 122 from the support sleeve 120 and replace them with a conventional type core drill shown at 160 in FIGURE 10. As will be seen from a comparison of FIGURES 10 and 11, the core drill 160 consists of a sleeve having the usual drilling teeth 162 at the lower end thereof. The sleeve is hollow in order to permit reception of the core sample therein during the drilling operation. At its upper end, the sleeve is provided with pairs of radially projecting apertured ears or lugs as at 164 secured between these lugs as by pins 166 are locking keys 168 in the form of plates which project inwardly through slots 170 in the core drill and into the previously mentioned slots 134 in the support sleeve 120 and further into the slots 142 in the lower end of the body or carrier 96. These plates thus serve to lock the sleeves and carriers together as well as securing the core drill thereto. As will be noted from FIGURE 10, the upper edge of the core drill abuts the lower edge of the sleeves 120 with the lugs 164 projecting upwardly thereabove for reception into the previously mentioned slots.

Reference has been made above to means for releasably locking the drilling apparatus to the lower casing section. For this purpose, as shown in FIGURE 13, radially outwardly projecting lugs 172 upon the upper portion of the drilling apparatus, as shown in FIGURES 1 and 2 are disposed to rotatably interlockingly engage the anchor lugs 174 projecting radially inwards from the casing section. The lugs 174 have stops 176 thereon engaged by the lugs 172 to limit rotation of the latter. The lugs 174 may be of the bayonet type and are so placed that when the drilling apparatus is properly rotationally oriented relative to the casing lugs 174, the lugs 172 will pass between the latter enabling the drilling apparatus to pass into and out of the casing section as desired. With this arrangement the drilling apparatus can be selectively locked to the casing for movement therewith or may be released therefrom for independent movement and drilling.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A well drilling apparatus comprising a vertically elongated hollow body adapted for movement into and through a well, a rotor mounted in said body for rotation about a vertical axis but fixed against relative axial displacement, a sleeve mounted in said body for both rotary and axial displacement and coupled to said rotor for rotation therewith, a carrier freely rotatable upon said sleeve but fixed against relative axial displacement, drill bits projecting below said body and pivoted to said carrier for movement about horizontal axes between a retracted position lying within the circumferential confines of said body and an expanded position projecting radially outwardly of said body, locking means connected to said drill bits and operable in response to pivoting of said drill bits in their said expanded position for releasably locking said carrier to said sleeve against relative rotation, reversely rotatable vertically extending actuator means mechanically and directly connecting said rotor to said drill bits for pivoting the latter between said retracted and expanded positions, means for imparting reversible rotation to said rotor.

2. The combination of claim 1 wherein said rotor and sleeve have adjacent end portions which are telescopically and slidably engaged.

3. The combination of claim 1 wherein said rotor and sleeve are each rotatably journaled upon internal walls of said hollow body, said sleeve being also slidably journaled upon said hollow body internal wall, said sleeve having its upper end embracingly receiving and slidably engaging said adjacent rotor end portion.

4. The combination of claim 3 wherein said sleeve has its lower end successively diametrically reduced and providing upper and lower reduced portions, said carrier being secured to and embracing said sleeve lower reduced portion.

5. The combination of claim 4 including a spring engaging said sleeve and hollow body and embracing said sleeve upper reduced portion and urging said sleeve upwardly toward said rotor.

6. The combination of claim 5 wherein said sleeve reduced lower portion has an annular groove upon its exterior surface, said carrier having an upper end rotatably embracing said sleeve exterior surface, a fastener on said carrier slidably retained in said annular groove.

7. The combination of claim 1 including a source of power disposed in said hollow body above said rotor, said rotor having a chamber therein opening upon and extending downwardly from the rotor top surface, means in said chamber connecting said power source to said rotor.

8. The combination of claim 7 wherein said connecting means includes an internal ring gear in said chamber secured to said rotor, a drive gear in said chamber connected to said source of power, idler gears mounted on axles carried by said hollow body and each engaging said drive gear and ring gear.

9. The combination of claim 1 wherein said locking means comprises portions on said drill bits engageable with said sleeve and locking said bits and sleeve against relative rotation when said bits are in their expanded position.

10. The combination of claim 9 wherein said carrier includes laterally projecting lugs, each bit being pivoted to a lug for vertical swinging about a generally horizontal axis, said locking means including registrable locking openings in said sleeve and carrier, each bit having said portion engageable in a pair of registering locking openings in said sleeve and carrier.

11. The combination of claim 1 wherein said bit actuator means includes a rod threadedly engaged with and extending axially downwardly from said rotor and between said bits, means connecting said rod to said bits for effecting rotation of the latter between said expanded and retracted positions only in response to axial movement of said rod relative to said rotor.

12. The combination of claim 11 wherein said rod and bit connecting means comprises an arcuate toothed portion on each bit and longitudinally spaced annular ribs on said rod engaging each toothed portion.

13. The combination of claim 1 wherein said body and sleeve have axially opposed thrust surfaces, cooperating cams, one on each thrust surface effecting reciprocation of said sleeve upon said rotor in response to rotation of said sleeve and rotor.

14. The combination of claim 13 including spring means exerting force upon said sleeve and urging said cams toward each other.

15. The combination of claim 14 wherein said spring means is disposed within said hollow body and surrounds said sleeve, a retainer in said hollow body and forming an abutment for said spring means and guidingly and slidingly embracing said carrier.

16. The combination of claim 1 including jacklegs movably journaled in said body and projecting to the exterior thereof for movement along paths inclined to the vertical axis of said body between a retracted inoperative position and an extended operative position for engaging the wall of a well bore or casing, actuating means connected to said jacklegs and to said rotor for periodically extending said jacklegs upon rotation of said rotor.

17. The combination of claim 16 wherein said last mentioned actuating means comprises a cam surface on said rotor actuating said jacklegs.

References Cited by the Examiner
UNITED STATES PATENTS

| | | | |
|---|---|---|---|
| 463,880 | 11/91 | Webber | 175—97 X |
| 1,091,502 | 3/14 | Gearing | 175—279 X |
| 1,175,952 | 3/16 | Haase | 176—97 |
| 1,406,348 | 2/22 | Corrigan | 175—97 |
| 1,427,064 | 8/22 | Caverly | 175—92 |
| 1,472,182 | 10/23 | McCracken | 175—286 |
| 1,607,082 | 11/26 | Howcott | 175—106 |
| 1,752,092 | 3/30 | Kapeluchnikoff | 175—286 |
| 1,826,634 | 10/31 | Pippin | 175—104 X |
| 1,841,302 | 1/32 | Simmons | 175—286 X |
| 1,858,926 | 5/32 | Grau et al. | 175—272 X |
| 2,463,420 | 3/49 | Prassel | 175—94 |
| 2,769,614 | 11/56 | Zeni | 175—94 |
| 2,822,148 | 2/58 | Murray | 175—104 X |
| 2,919,121 | 12/59 | Ruth | 175—94 |

CHARLES E. O'CONNELL, *Primary Examiner.*